United States Patent
Kang

(10) Patent No.: US 11,754,262 B1
(45) Date of Patent: Sep. 12, 2023

(54) LIGHTING EMBLEM ASSEMBLY

(71) Applicant: HYUNDAI MOBIS CO., LTD., Seoul (KR)

(72) Inventor: I Seul Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/991,973

(22) Filed: Nov. 22, 2022

(30) Foreign Application Priority Data

May 2, 2022 (KR) .......................... 10-2022-0053991

(51) Int. Cl.
| | |
|---|---|
| *F21V 19/00* | (2006.01) |
| *F21V 8/00* | (2006.01) |
| *B60Q 3/20* | (2017.01) |
| *B60R 21/215* | (2011.01) |
| *F21Y 115/10* | (2016.01) |
| *F21W 106/00* | (2018.01) |

(52) U.S. Cl.
CPC .............. *F21V 19/003* (2013.01); *B60Q 3/20* (2017.02); *B60R 21/215* (2013.01); *G02B 6/0005* (2013.01); *B60R 2021/21543* (2013.01); *F21W 2106/00* (2018.01); *F21Y 2115/10* (2016.08)

(58) Field of Classification Search
CPC ....... F21V 19/003; B60Q 3/20; B60R 21/215; G02B 6/0005
See application file for complete search history.

(56) References Cited

U.S. PATENT DOCUMENTS

| | | | |
|---|---|---|---|
| 2009/0273165 A1* | 11/2009 | Worrell | B60R 21/21656 280/728.3 |
| 2014/0208483 A1* | 7/2014 | Tuohy | A42B 1/248 2/209.13 |
| 2014/0210190 A1* | 7/2014 | Bosch | B60R 21/203 280/728.3 |
| 2015/0108742 A1* | 4/2015 | Bosch | B60R 21/215 280/728.3 |
| 2017/0205086 A1* | 7/2017 | Yanase | F24F 13/20 |
| 2020/0355361 A1* | 11/2020 | Bryant | A42B 1/248 |
| 2022/0080919 A1* | 3/2022 | Ko | B60Q 3/283 |

* cited by examiner

*Primary Examiner* — Evan P Dzierzynski
(74) *Attorney, Agent, or Firm* — Novo TechIP International PLLC

(57) ABSTRACT

A lighting emblem assembly according to an embodiment of the present invention may include a cover having an installation region surrounded by an inner sidewall and including a light opening formed to pass through the installation region, an inner cover installed in the installation region and including an installation groove, and a lighting module which is installed in the installation groove, is connected to an external power source using a cable connected to a connector, and emits light to an outside through the light opening. The cable may extend between the inner cover and the inner sidewall to an upper end portion of the inner sidewall, and in a state in which the connector extends to an outside of the installation region, a root portion connected to the connector of the cable may be fixedly restricted by a fixing part provided on the inner cover.

12 Claims, 8 Drawing Sheets

120: 122, 123, 124
110: 111, 112
100: 110, 120

LIGHTING EMBLEM ASSEMBLY

CROSS-REFERENCE TO RELATED APPLICATIONS

This application claims priority to and the benefit of Korean Patent Application No. 10-2022-0053991, filed on May 2, 2022, the disclosure of which is incorporated herein by reference in its entirety.

TECHNICAL FIELD

The present invention relates to a lighting emblem assembly, and more specifically, to a lighting emblem assembly installed on a driver's airbag of a center of a handle.

BACKGROUND

Generally, decorations called emblems symbolizing brand images, such as car manufacturer logos or car names for appealing to consumers, are mounted on front and rear grilles, the center of a trunk panel, and a driver's airbag (DAB) cover of the center of a handle.

Such vehicle emblems have only a function to simply display brand representation and have a problem that it is difficult to expect a better synergy effect. Particularly, the vehicle emblems can be identified by reflection of natural light during the day, but there is a problem that the function is not properly performed at night due to lack of light because lighting is not applied to the emblem.

In order to solve this problem, technologies for applying lighting to emblems mounted on driver's airbag covers are being developed. When a power cable connected to an external power source is used in order to drive a light emitting diode (LED) used as a light source for lighting, a sagging phenomenon of the power cable due to the weight thereof occurs when a driver's airbag is assembled, thereby causing generation of rattle or noise.

SUMMARY

The present invention is directed to providing a lighting emblem assembly capable of removing a cause of generating rattle or noise by preventing a sagging phenomenon of a cable occurring when a driver's airbag is assembled.

The objectives of the present invention are not limited to the above-described objectives, and the other objectives which are not described above will be clearly understood by those skilled in the art through the following description.

According to an aspect of the present invention, there is provided a lighting emblem assembly including a cover having an installation region surrounded by an inner sidewall and including a light opening formed to pass through the installation region, an inner cover installed in the installation region and including an installation groove, and a lighting module which is installed in the installation groove, is connected to an external power source using a cable connected to a connector, and emits light to an outside through the light opening, wherein the cable extends between the inner cover and the inner sidewall to an upper end portion of the inner sidewall, and in a state in which the connector extends to an outside of the installation region, a root portion connected to the connector of the cable is fixedly restricted by a fixing part provided on the inner cover.

The inner cover may include a base plate including the installation groove and fixed to an inner surface of the cover in the installation region and a side plate extending from one side of the base plate and facing the inner sidewall, wherein the fixing part may be provided on an end portion of the side plate.

The fixing part may include a first fixing part including a first slit cut downward from an end of the side plate and a second slit horizontally cut from an end of the first slit and a second fixing part including a first body protruding upward from the end portion of the side plate spaced apart from the first slit, a second body extending from an end of the first body toward the inner sidewall, a third body extending from an end of the second body toward the first slit, and a fourth body extending downward from an end of the third body.

A size of the second slit in a width direction and a height of the first body may be equal to at least a thickness of the cable, a length of the second body may be equal to at least a thickness of the inner sidewall, and a distance between the fourth body and the inner sidewall may be smaller than the thickness of the cable.

The side plate may include an accommodation groove which accommodates the cable therein.

One side of the accommodation groove may be connected to the installation groove, and the other side thereof may be connected to the second slit.

The side plate may include catch hooks, which are fixedly hooked on the upper end portion of the inner sidewall at the end portion.

The catch hooks may be disposed at two left and right sides of the fixing part thereof.

The lighting module may include a printed circuit board connected to the cable and disposed in the installation groove, a plurality of light-emitting elements installed on the printed circuit board, a cap which is mounted on the installation groove and covers the printed circuit board, and a lens which guides light generated by the light-emitting elements to the light opening.

The lens may include light guide parts disposed on the light-emitting elements.

The lighting emblem assembly may further include a cover plate mounted on the light opening.

The cover plate may include a plate member which is disposed on an outer surface of the cover, covers the light opening, and includes a through hole connected to the light opening and a stopper which is connected to the plate member on an inner surface of the cover and fixes the plate member, wherein the light guide part may pass through the light opening and the through hole and emit light to the outside.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
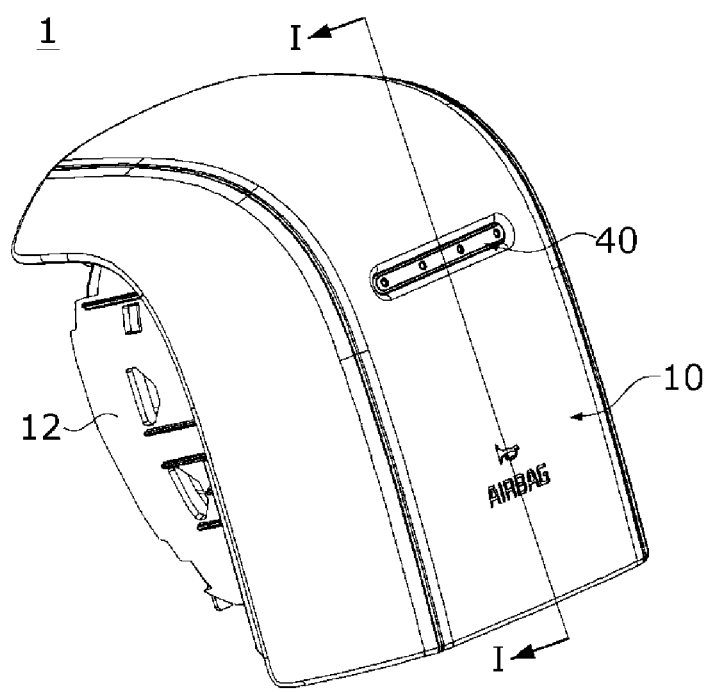
FIG. 1 is a schematic perspective view illustrating a lighting emblem assembly according to an embodiment of the present invention.

Since the present invention allows various changes and has many embodiments, specific embodiments will be illustrated in the accompanying drawings and be described. However, this is not intended to limit the present invention to the specific embodiments, and it is to be appreciated that all changes, equivalents, and substitutes that fall within the spirit and technical scope of the present invention are encompassed in the present invention. Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination of a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present invention. The singular forms are intended to include the plural forms unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, embodiments will be described in detail with reference to the accompanying drawings, components that are the same or correspond to each other will be denoted by the same or corresponding reference numerals regardless of symbols of the accompanying drawings, and redundant descriptions will be omitted.

Figure 2:
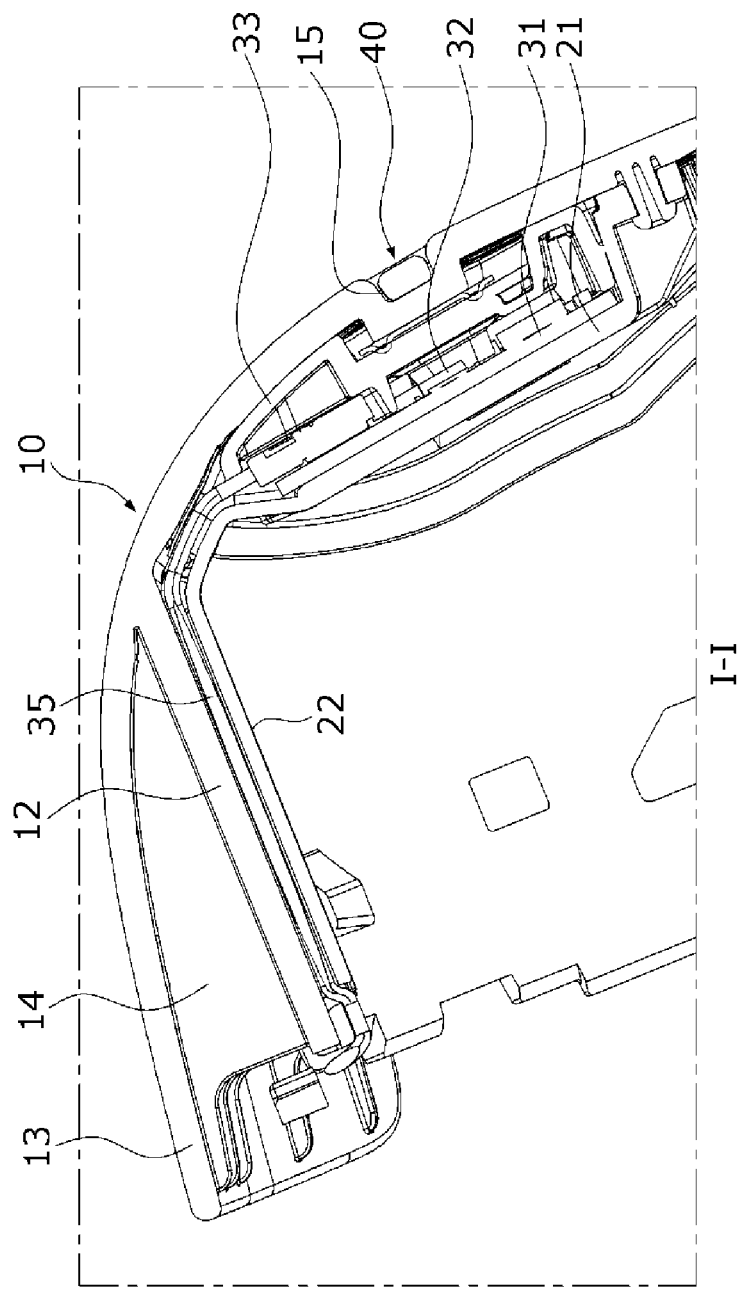
FIG. 2 is a cross-sectional view along line I-I illustrated in FIG. 1.
Figure 3:
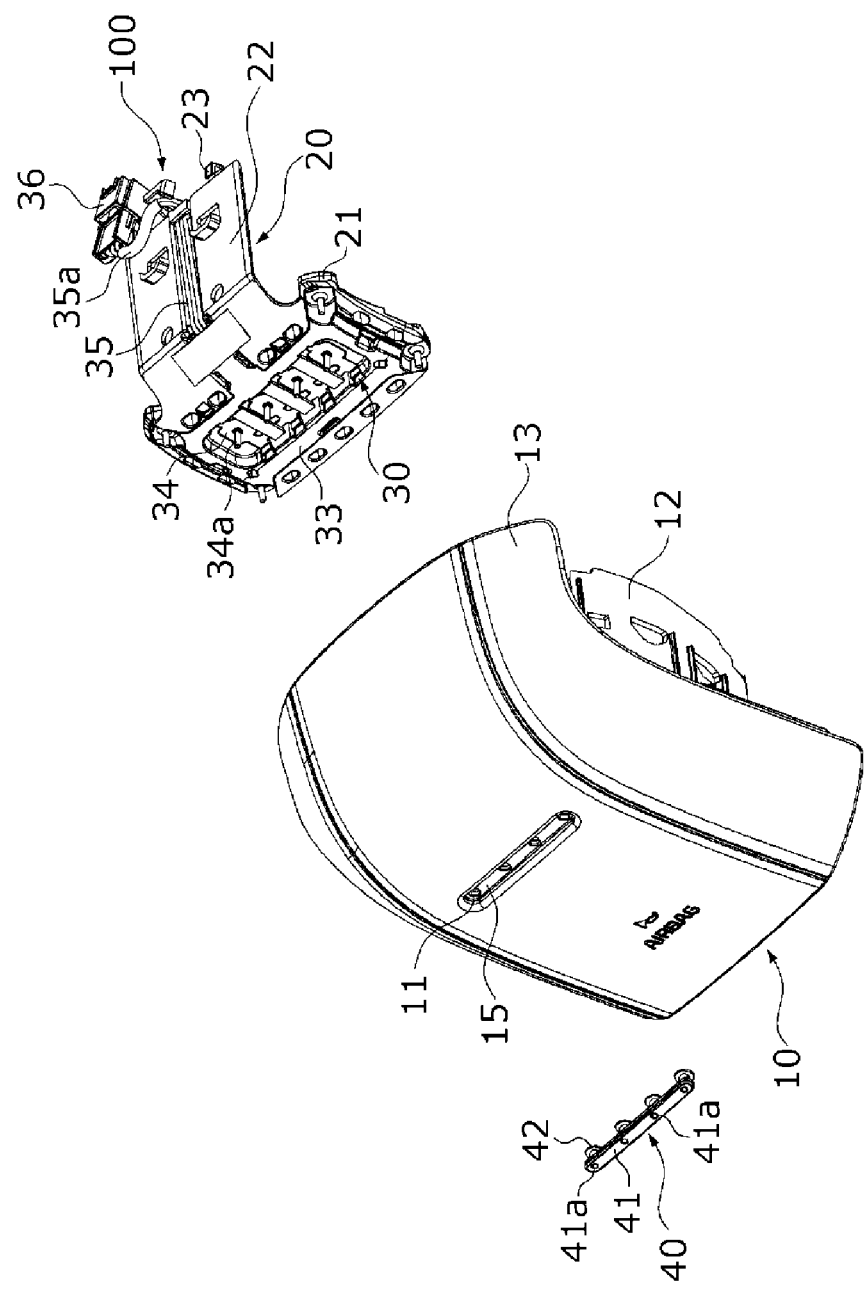
FIG. 3 is an exploded schematic perspective view illustrating a state in which a cover and an inner cover are separated in the lighting emblem assembly of FIG. 1.
Figure 4:
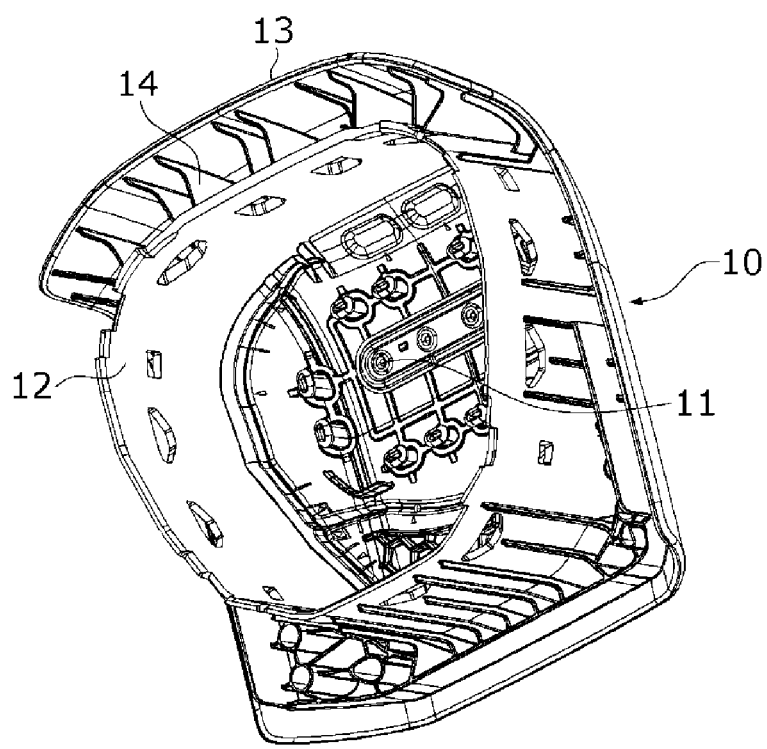
FIG. 4 is a schematic perspective view illustrating an inner portion of the cover.
Figure 5:
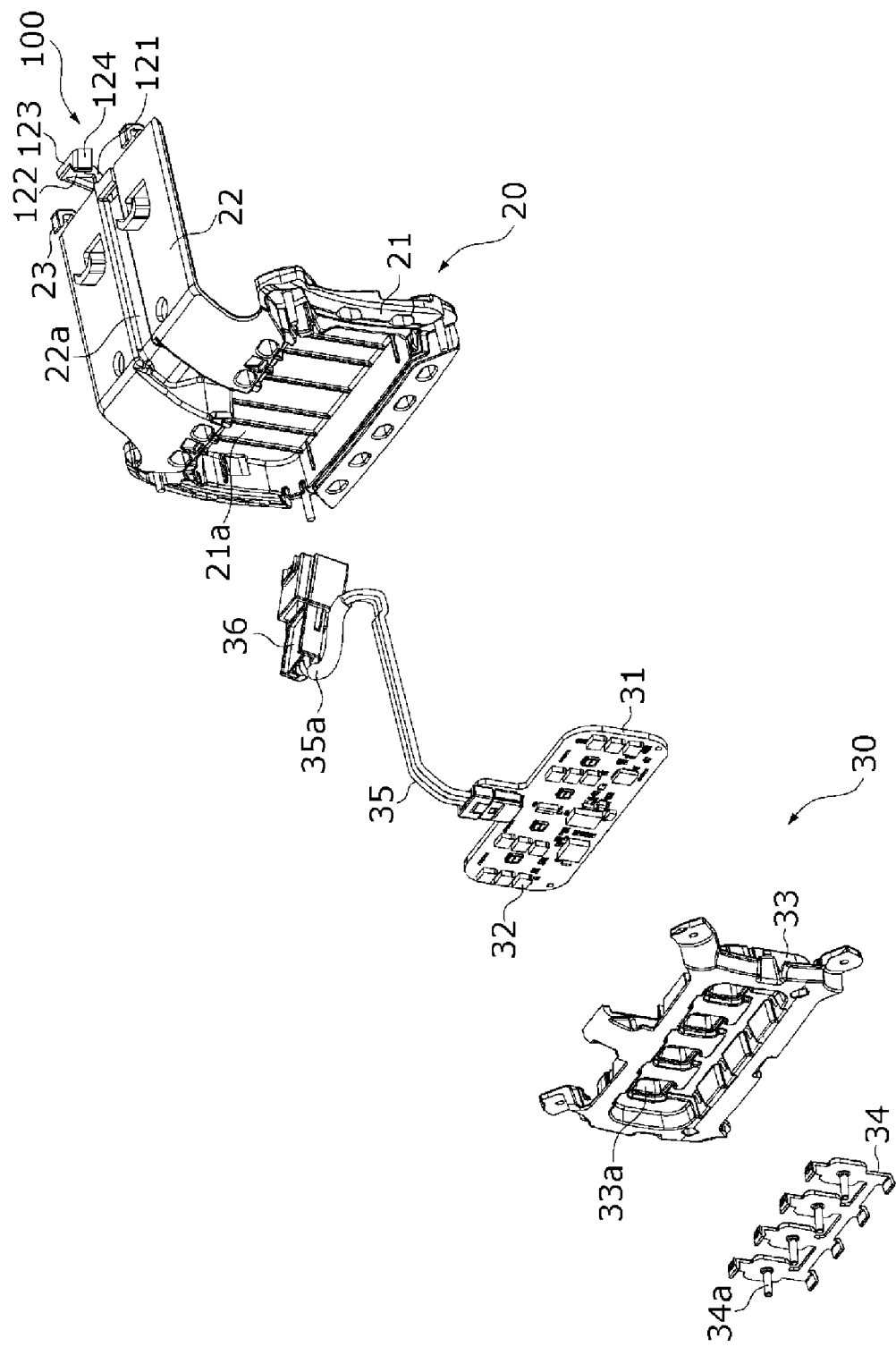
FIG. 5 is an exploded schematic perspective view illustrating a state in which the inner cover and a lighting module are separated in the lighting emblem assembly of FIG. 3.
Figure 6:
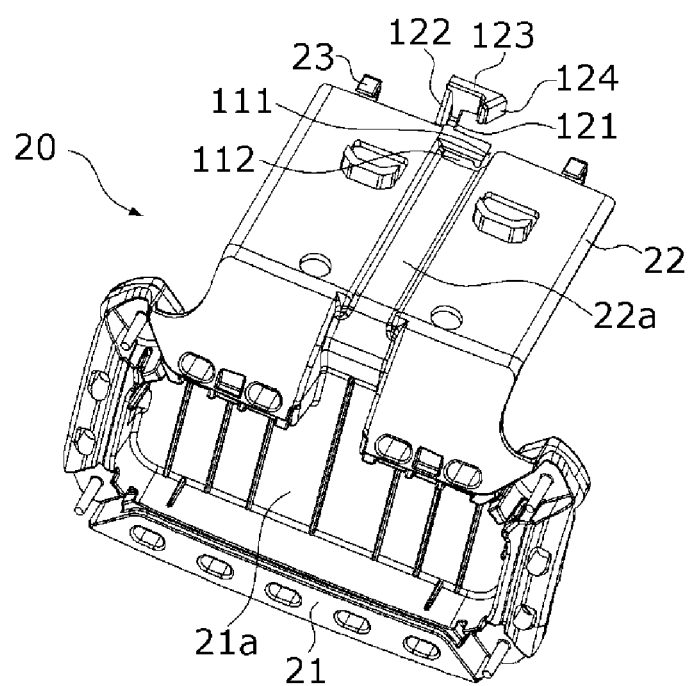
FIG. 6 is a schematic perspective view illustrating the inner cover in the lighting emblem assembly of FIG. 5.
Figure 7:
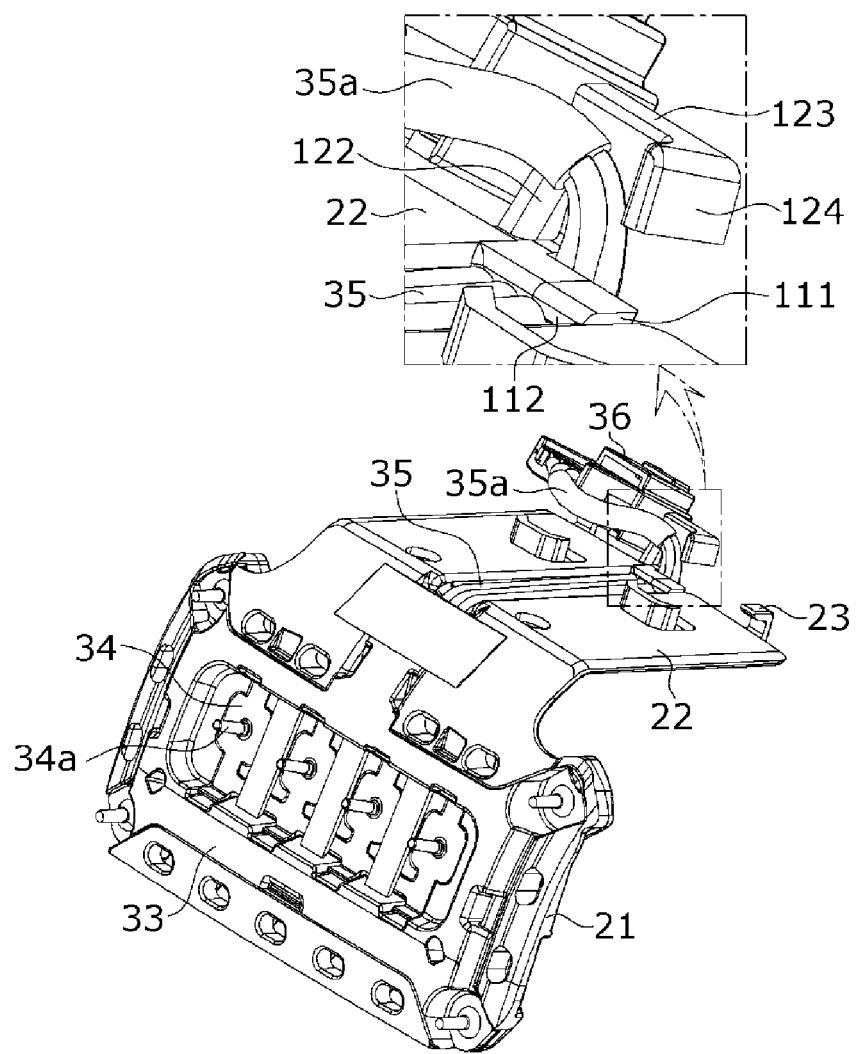
FIG. 7 is a schematic perspective view illustrating a state in which a cable is fixed to a fixing part of the inner cover in the lighting emblem assembly of FIG. 3.
Figure 8:
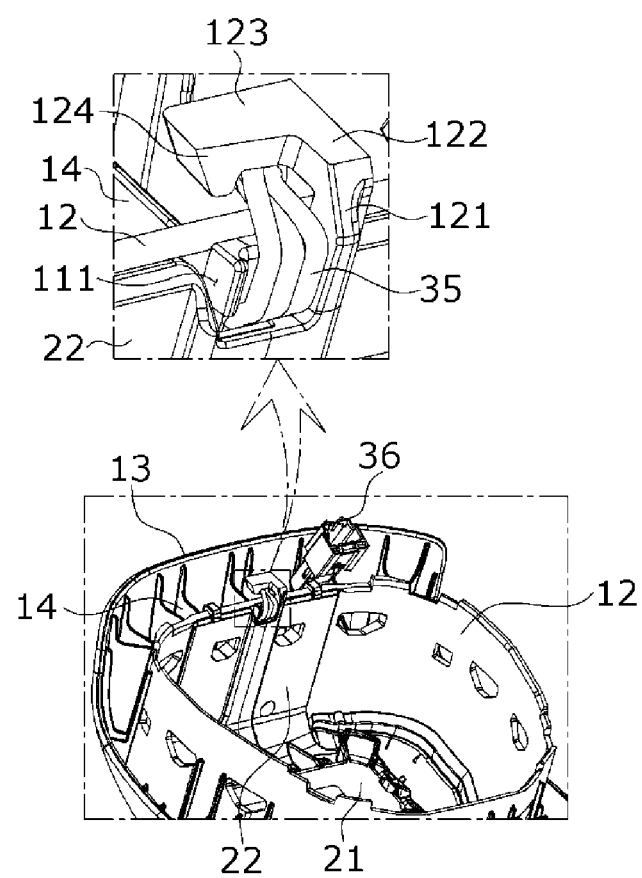
FIG. 8 is a schematic perspective view illustrating a state in which the cable is fixedly restricted by the fixing part in a state in which the inner cover is installed in the cover.

FIG. 1 is a schematic perspective view illustrating a lighting emblem assembly according to an embodiment of the present invention, and FIG. 2 is a cross-sectional view along line I-I illustrated in FIG. 1. FIG. 3 is an exploded schematic perspective view illustrating a state in which a cover and an inner cover are separated in the lighting emblem assembly of FIG. 1, and FIG. 4 is a schematic perspective view illustrating an inner portion of the cover. FIG. 5 is an exploded schematic perspective view illustrating a state in which the inner cover and a lighting module are separated in the lighting emblem assembly of FIG. 3, and FIG. 6 is a schematic perspective view illustrating the inner cover in the lighting emblem assembly of FIG. 5. FIG. 7 is a schematic perspective view illustrating a state in which a cable is fixed to a fixing part of the inner cover in the lighting emblem assembly of FIG. 3, and FIG. 8 is a schematic perspective view illustrating a state in which the cable is fixedly restricted by the fixing part in a state in which the inner cover is installed in the cover.

Referring to the drawings, a lighting emblem assembly 1 according to the embodiment of the present invention may include a cover 10, an inner cover 20 disposed at (i.e., installed in) the cover 10, and a lighting module 30 mounted on the inner cover 20.

The inner cover 20 corresponds to a housing structure which accommodates and supports the lighting module 30, along with the lighting module 30, may be installed in the cover 10 and may fix the lighting module 30 in the cover 10.

According to the embodiment, the lighting module 30 may be installed in an installation groove 21*a* of the inner cover 20. In addition, the lighting module 30 may be disposed between the cover 10 and the inner cover 20 in a state in which the inner cover 20 is installed in the cover 10.

The lighting module 30 may be coupled to (i.e., connected to) an external power source using a cable 35 connected to a connector 36 and may emit light to the outside through a light opening 11 provided in the cover 10.

The lighting module 30 may include a printed circuit board (PCB) 31 connected to the cable 35, a plurality of light-emitting elements 32 installed on the printed circuit board 31, a cap 33 installed on the installation groove 21*a* to cover the printed circuit board 31, and a lens 34 which guides light generated by the light-emitting element 32 to the light opening 11.

The printed circuit board 31 may have a shape corresponding to a shape of the installation groove 21*a*, and in the present embodiment, an example of a roughly quadrangular shape is illustrated, but the present invention is not limited thereto.

The printed circuit board 31 may be fixedly disposed in the installation groove 21*a*, the cable 35 may be connected to one side of the printed circuit board 31, and thus the printed circuit board 31 may be connected to the external power source through the connector 36.

The plurality of light-emitting elements 32 may be installed on the printed circuit board 31 and may generate light using power supplied through the cable 35. The light-emitting element 32 may include a light-emitting diode (LED), a laser diode, or the like and may be configured to generate light with various colors.

The cap 33 may cover the printed circuit board 31 installed in the installation groove 21a to prevent foreign materials from being introduced so as to protect the light-emitting element 32 and the printed circuit board 31 from an external environment. Installation holes 33a may be formed in the cap 33 to correspond to positions of the light-emitting elements 32, and the installation holes 33a correct a position of the lens 34 to allow light of the light-emitting element 32 to pass through the cap 33.

The lens 34 may be installed in the installation hole 33a of the cap 33 and may guide light generated by the light-emitting element 32 to the light opening 11. According to the embodiment, the lens 34 may include light guide parts 34a disposed on the light-emitting elements 32. The light guide parts 34a may have a substantially long bar shape to extend to a cover plate 40 provided in the light opening 11.

Hereinafter, the inner cover 20 on which the lighting module 30 is mounted and the cover 10 in which the inner cover 20 is installed with the lighting module 30 will be described.

The cover 10 may be installed at the center of a handle, which is not illustrated, and formed to cover a driver's airbag which is not illustrated.

The cover 10 may have an installation region surrounded by an inner sidewall 12, and the driver's airbag may be fixedly installed in the installation region.

The installation region constituted by the inner sidewall 12 may be formed of any shape corresponding to a shape of the driver's airbag. According to the present embodiment, an example of the inner sidewall 12 formed in a circular shape protruding from an inner surface of the cover 10 is illustrated.

A plurality of ribs 14 may be formed between the inner sidewall 12 and an outer sidewall 13 of the cover 10 to reinforce stiffness and may connect the inner sidewall 12 and the outer sidewall 13.

The cover 10 may include the light opening 11 formed to pass through the installation region. The light opening 11 may have a substantially circular shape, may be provided as a plurality of light openings 11 corresponding to the light guide parts 34a of the lighting module 30, and allows light generated by the lighting module 30 to be emitted to the outside. According to the present embodiment, an example in which four light openings 11 are formed is illustrated, but the present invention is not limited thereto.

The light openings 11 may be provided to be arrayed in a line form on a bottom of a groove 15 concavely formed in an outer surface of the cover 10.

According to the embodiment, the cover plate 40 formed of a material through which light pass may be fitted into the light opening 11. The cover plate 40 may include a plate member 41 which is disposed on the outer surface of the cover 10 and covers the light opening 11 and a stopper 42 disposed on the inner surface of the cover 10 and fixedly connected to the plate member 41.

The plate member 41 may be fitted into the groove 15 in the outer surface of the cover 10 and may include a through hole 41a extending to the light opening 11.

The light guide part 34a of the lens 34 may be inserted into the light opening 11 and the through hole 41a, and the lighting module 30 may emit light to the outside through the light opening 11 and the through hole 41a.

The inner cover 20 may be installed in the installation region to be installed in the cover 10. The inner cover 20 may be disposed between the cover 10 and the driver's airbag in the installation region.

The inner cover 20 may include a base plate 21 coupled to (i.e., fixed to) the inner surface of the cover 10 in the installation region and a side plate 22 extending to be bent at one side of the base plate 21 and facing the inner sidewall 12.

The base plate 21 and the side plate 22 may be integrally formed, and an end portion of the side plate 22 may extend to an upper end portion of the inner sidewall 12. That is, the end portion of the side plate 22 and the upper end portion of the inner sidewall 12 may be positioned at the same horizontal level.

The base plate 21 may include the installation groove 21a, in which the lighting module 30 is installed, in a surface facing the inner surface of the cover 10.

The side plate 22 may include a fixing part 100, which fixedly restricts a movement of the cable 35 extending from the lighting module 30, at the end portion.

According to the embodiment, the fixing part 100 may include a first fixing part 110 and a second fixing part 120.

The first fixing part 110 may include a first slit 111 extending downward from the end portion of the side plate 22 and a second slit 112 horizontally extending from an end of the first slit 111. That is, the first fixing part 110 may have a structure having a shape extending in substantially an "L" shape.

The cable 35 may be press-fitted into the first slit 111 and fixedly fitted into the second slit 112. To this end, a width of the second slit 112 may be formed greater than or equal to at least a thickness of the cable 35.

The second fixing part 120 may include a first body portion 121 protruding upward from the end portion of the side plate 22 at a position spaced apart from the first slit 111, a second body portion 122 extending from an end of the first body portion 121 toward the inner sidewall 12, a third body portion 123 extending from an end of the second body portion 122 toward the first slit 111 and disposed parallel to the side plate 22, and a fourth body portion 124 extending downward from an end of the third body portion 123. That is, the third body portion 123 and the fourth body portion 124 are disposed apart from each other in an upward direction from the end portion of the side plate 22 by the first body portion 121 and disposed apart outward from the end portion of the side plate 22 by the second body portion 122, and thus a space capable of accommodating and restricting the cable 35 may be formed between the third body portion 123 and the end portion of the side plate 22 and between the second body portion 122 and the fourth body portion 124.

In order to prevent separation of the cable 35 in a state in which the cable 35 is fitted into the space between the second fixing part 120 and the end portion of the side plate 22, a height of the first body portion 121 may be greater than or equal to at least the thickness of the cable 35, and a length of the second body portion 122 may be greater than or equal to at least a thickness of the inner sidewall 12. In addition, a distance between the fourth body portion 124 and the inner sidewall 12 may be smaller than a total thickness of the cable 35.

Meanwhile, the side plate 22 may include an accommodation groove 22a in which the cable 35 is accommodated. The accommodation groove 22a may be provided in an outer surface facing the inner sidewall 12 of the side plate 22.

The accommodation groove 22a may longitudinally extend from the installation groove 21a to the fixing part 100 in an extending direction of the side plate 22. That is, one side of the accommodation groove 22a may be extending to the installation groove 21a, and the other side may be extending to the second slit 112.

When the lighting module 30 is installed in the installation groove 21a of the base plate 21, the cable 35 extending to the connector 36 may be accommodated in the accommodation groove 22a and may extend to the upper end portion of the inner sidewall 12 between the side plate 22 of the inner cover 20 and the inner sidewall 12.

The extended cable 35 may be press-fitted into the first slit 111 at the end portion of the side plate 22 and then fitted into the second slit 112, that is, the extended cable 35 is primarily fixed by being fitted from the side surface toward an inner surface of the side plate 22.

In addition, in the state of being fitted into the second slit 112, the cable 35 may extend over the end portion of the side plate 22 and may be bent toward the outer surface and secondarily fixed by being fitted into the space provided between the third body portion 123 and the end portion of the side plate 22 and between the second body portion 122 and the fourth body portion 124. That is, in the space, the cable 35 may be blocked and restricted by the second body portion 122 and the fourth body portion 124 in a lateral direction and by the third body portion 123 and the end portion of the side plate 22 in a vertical direction so that the cable 35 can be fixed without being separated.

As described above, in a state in which the connector 36 extends to the outside of the installation region, a root portion 35a of the cable 35 connected to the connector 36 may be fixedly restricted by the fixing part 100 included in the inner cover 20, and thus, a sagging phenomenon of the cable 35 due to the weight thereof does not occur when the driver's airbag is assembled, thereby preventing generation of rattle or noise.

According to one embodiment, a side plate 22 may include catch hooks 23, which are engaged to (i.e., fixedly hooked on) an upper end portion of an inner sidewall 12, on an end portion. The catch hooks 23 may be disposed at two left and right sides of the fixing part 100.

In a state in which an inner cover 20 is installed in an installation region of a cover 10, and an outer surface of the side plate 22 is disposed in contact with the inner sidewall 12, the catch hooks 23 may be fixedly hooked on the upper end portion of the inner sidewall 12 so that the side plate 22 can be fixedly mechanically coupled to the inner sidewall 12 without moving.

According to embodiments, a lighting emblem assembly capable of removing a cause of generating rattle or noise by preventing a sagging phenomenon of a cable occurring when a driver's airbag is assembled can be provided.

The effects of the present invention are not limited to the above-described effects, and other effects which are not described above will be clearly understood by those skilled in the art through the appended claims.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to modifications and changes fall within the scope of the present invention defined by the appended claims.

What is claimed is:

1. A lighting emblem assembly comprising:
a cover having a light opening, an inner sidewall and an installation region surrounded by the inner sidewall;
an inner cover disposed at the installation region of the cover and having an installation groove;
a lighting module disposed at the installation groove of the inner cover, sandwiched between the cover and inner cover, and configured to emit light through the light opening of the cover;
a connector having a root portion, disposed above the installation region of the cover, and configured to connect to an external power source;
a cable extending from the lighting module to the root portion of the connector through a space between the inner cover and the inner sidewall of the cover; and
a fixing part disposed at the inner cover and configured to restrict a movement of the root portion of the connector.

2. A lighting emblem assembly comprising:
a cover having a light opening, an inner sidewall and an installation region surrounded by the inner sidewall;
an inner cover disposed at the installation region of the cover and having an installation groove;
a lighting module disposed at the installation groove and configured to emit light through the light opening;
a connector having a root portion, disposed above the installation region of the cover, and configured to connect to an external power source;
a cable extending from the lighting module to the root portion of the connector through a space between the inner cover and the inner sidewall of the cover; and
a fixing part disposed at the inner cover and configured to restrict a movement of the root portion of the connector,
wherein the inner cover includes (1) a base plate including the installation groove and coupled to an inner surface of the cover and (2) a side plate extending from the base plate and facing the inner sidewall of the cover, and
wherein the fixing part is disposed at an end portion of the side plate.

3. The lighting emblem assembly of claim 2, wherein the fixing part includes:
a first fixing part including (1) a first slit extending downwardly from the end portion of the side plate, and (2) a second slit horizontally extending from an end of the first slit; and
a second fixing part including (1) a first body portion protruding upwardly from the end portion of the side plate, (2) a second body portion extending from an end of the first body toward the inner sidewall of the cover, (3) a third body portion extending from an end of the second body portion toward the first slit, and (4) a fourth body portion extending downwardly from an end of the third body portion.

4. The lighting emblem assembly of claim 3, wherein:
a width of the second slit and a height of the first body portion are equal to or greater than a thickness of the cable,
a length of the second body portion is equal to or greater than a thickness of the inner sidewall, and
a distance between the fourth body portion and the inner sidewall is smaller than the thickness of the cable.

5. The lighting emblem assembly of claim 3, wherein the side plate includes an accommodation groove at which the cable is disposed.

6. The lighting emblem assembly of claim 5, wherein the accommodation groove has (1) a first side extending to the installation groove of the base plate, and (2) a second side extending to the second slit.

7. The lighting emblem assembly of claim 2, wherein the side plate includes a catch hook engaged to an upper end portion of the inner sidewall of the cover.

8. The lighting emblem assembly of claim 7, wherein the catch hook includes first and second catch hooks respectively disposed at left and right sides of the fixing part.

9. A lighting emblem assembly comprising:
- a cover having a light opening, an inner sidewall and an installation region surrounded by the inner sidewall;
- an inner cover disposed at the installation region of the cover and having an installation groove;
- a lighting module disposed at the installation groove and configured to emit light through the light opening;
- a connector having a root portion, disposed above the installation region of the cover, and configured to connect to an external power source;
- a cable extending from the lighting module to the root portion of the connector through a space between the inner cover and the inner sidewall of the cover; and
- a fixing part disposed at the inner cover and configured to restrict a movement of the root portion of the connector, wherein the lighting module includes:
- a printed circuit board (PCB) connected to the cable and disposed in the installation groove of the inner cover;
- a plurality of light-emitting elements disposed on the PCB and configured to emit light;
- a cap disposed on the installation groove and covering the PCB; and
- a lens configured to guide the light emitted from the light-emitting elements to the light opening of the cover.

10. The lighting emblem assembly of claim 9, wherein the lens includes a light guide part disposed on the plurality of light-emitting elements.

11. The lighting emblem assembly of claim 10, further comprising a cover plate disposed on the light opening.

12. The lighting emblem assembly of claim 11, wherein:
- the cover plate includes (1) a plate member disposed on an outer surface of the cover, covering the light opening and including a through hole extending to the light opening, and (2) a stopper coupled to the plate member on an inner surface of the cover and configured to fix the plate member, and
- the light guide part extends through the light opening and the through hole of the plate member.

* * * * *